June 18, 1929.  E. E. WEMP  1,717,534
CLUTCH CONSTRUCTION
Filed Oct. 6, 1926   3 Sheets-Sheet 1

INVENTOR.
Ernest E. Wemp.

June 18, 1929.  E. E. WEMP  1,717,534
CLUTCH CONSTRUCTION
Filed Oct. 6, 1926   3 Sheets-Sheet 3

INVENTOR.
Ernest E. Wemp.
BY
ATTORNEY.

Patented June 18, 1929.

1,717,534

UNITED STATES PATENT OFFICE.

ERNEST E. WEMP, OF DETROIT, MICHIGAN.

CLUTCH CONSTRUCTION.

Application filed October 6, 1926. Serial No. 139,826.

This invention relates to clutch construction and has to do particularly with clutches of the disk or plate type in which the cover plate is formed of a single integral piece and the driving and driven elements are arranged in a novel manner to present an extremely compact and efficient clutch structure.

Another object of this invention is the provision of a cover plate formed as a single unit for receiving and positioning the clutch springs and which cover plate is provided with slots around its circumference for receiving the pressure relieving levers for operating the pressure rings or plates. These slots are relatively wide to receive pressure relieving levers which are relatively wide at the point where they pass through the cover plate, part of the slots forming a fulcrum for the actuating levers. By this arrangement the actuating levers may be substantially enclosed by the cover plate and by utilizing the slots in the cover plate as fulcrum points an efficient but very inexpensive structure is obtained.

Another feature of the present invention contemplates the provision of means between the pressure rings, or plates, and the helical clutch actuating springs whereby the transfer of heat from the clutch parts to the springs is reduced to a minimum.

A further feature of this invention contemplates the provision of a plurality of pressure ring members, driving means passing therethrough including a spacing element for spacing and positioning the flywheel and cover plate, resilient means for insuring the positive release of the clutch disks, and adjustable means for determining the amount of clearance between the first and second pressure rings or plates. This not only assures positive gripping and driving of the clutch disks, but also insures quick and free release of the clutch disks when desired.

Figure 2:
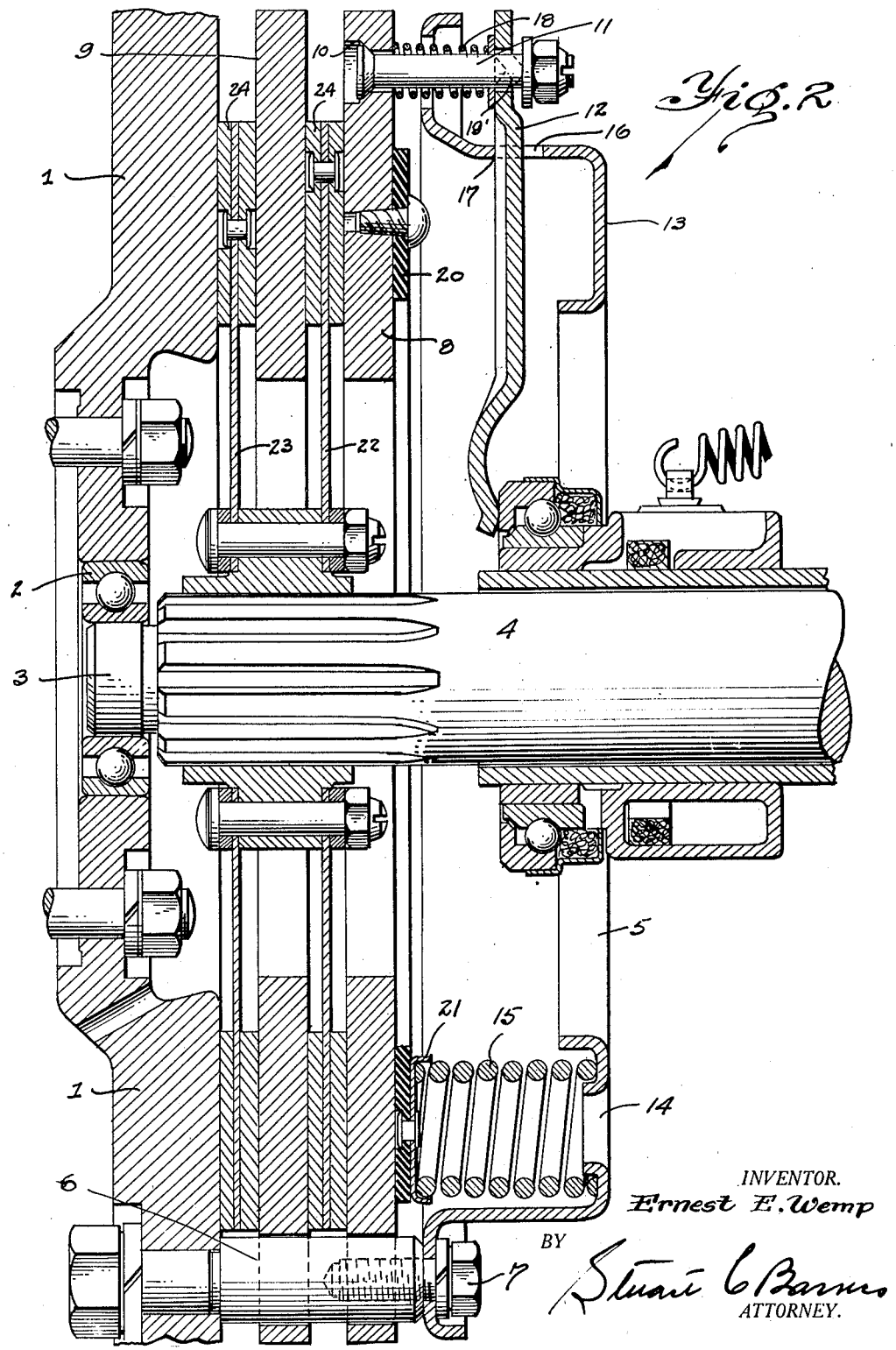
Fig. 2 is a longitudinal section taken on line 2—2 of Fig. 1.
Figure 3:
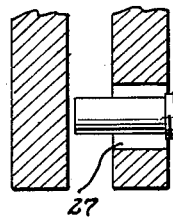
Fig. 3 is a fragmentary section taken through one of the adjusting pins in the cover plate and showing the manner of determining the clearance between the pressure plates.
Figure 6:
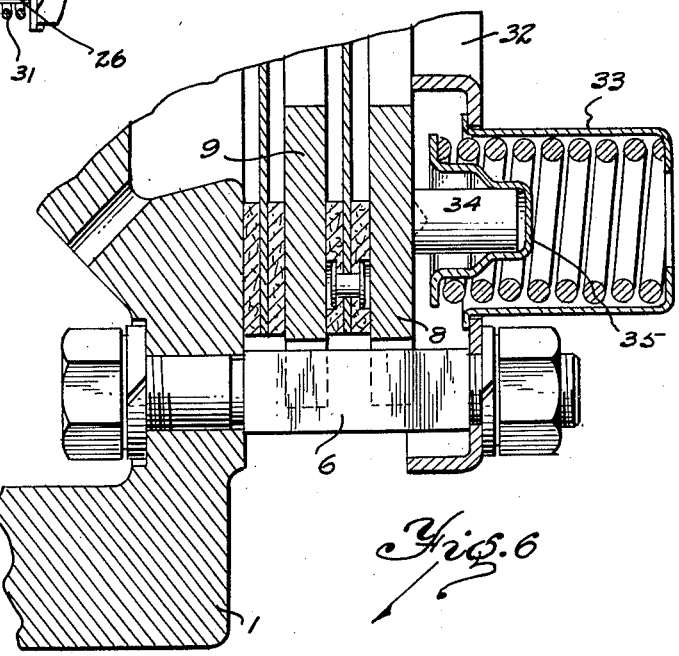
Fig. 6 is a fragmentary sectional view of a modified form of my clutch structure and also showing a different manner of dissipating or preventing the transfer of heat from the clutch parts to the clutch spring members.
Figure 5:
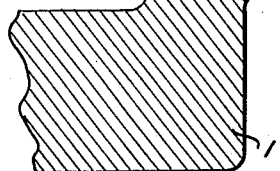
Fig. 5 is a detail perspective view of the specially formed washer for the adjusting screw and adapted to cooperate therewith for determining the clearance between the pressure plates.

The flywheel for receiving my novel clutch assembly may be of any standard design. In Fig. 2 the flywheel is shown in fragmentary section, as at 1, and it will be understood that this flywheel may be provided with a rearwardly extending boss surrounding the clutch assembly or may be provided with a forwardly extending portion, such as shown in Fig. 6. The flywheel may be provided with a pilot bearing 2 for receiving a pilot 3 of a driven shaft 4.

The cover plate is formed of a single piece of metal and may be designated 5. This cover plate is preferably secured to the flywheel by suitable driving pins or studs 6. These pins or studs 6 are preferably turned down to provide a shoulder at one end and are preferably drilled and tapped at the other end to receive suitable screws 7. These driving pins 6 are mounted and carried by the flywheel 1 and serve to support and space the integral cover plate 5, as shown in Fig. 2.

The main driving elements consist of the pressure rings or plates 8 and 9 which are provided with a plurality of openings spaced around and adjacent the periphery thereof for receiving the driving pins 6. The outer or primary pressure ring 8 is provided with a plurality of countersunk openings 10 for receiving suitable pins 11. These pins 11 serve as connecting means between pressure relieving levers 12 and the pressure ring 8.

Figure 1:
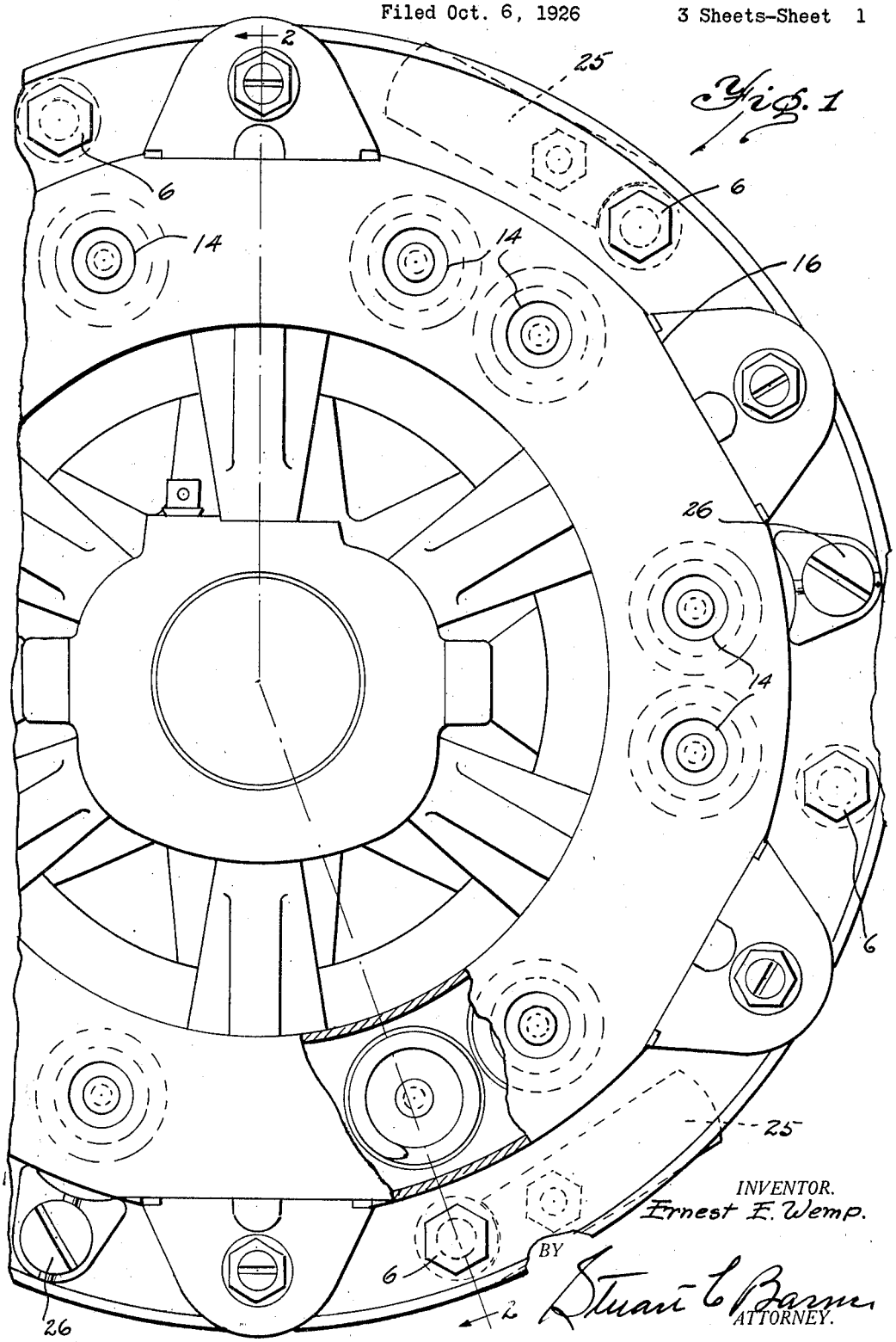
Fig. 1 is an elevation of my novel clutch structure and showing the positioning of the clutch springs between the actuating levers, and also showing the relative width of the actuating levers at the point of fulcruming.

The cover plate 5 is formed to provide an inwardly extending annular part 13 which is provided with a plurality of openings 14 formed by pressing inwardly a portion of the cover plate. These inwardly struck-in portions are of such size as to receive helical clutch springs 15 of the standard type. It will be obvious by inspection of Fig. 2 that the inwardly projecting portions 14 of the various openings serve to position the coil springs 15. The coil springs are preferably arranged in pairs spaced around the channel 13 of the cover plate and between each set of coil springs is positioned a clutch actuating lever 12. The cover plate 5 is provided with a plurality of slots 16 for receiving the levers 12 and as the levers 12 are so shaped as to be relatively wide at the point they pass through the cover plate the slots 16 are accordingly relatively wide. The portion of the cover plate which acts as a fulcrum for the levers 12 may be designated 17, and due to the relatively wide width of the levers it will be obvious that the pressure will be distributed over a relatively wide area. The lever 12 may be struck up in the center portion thereof, as shown in Figs. 1 and 2 for reinforcement and to provide a more even seating of the lever upon the fulcrum 17 provided by the cover 5. A suitable spring 18 formed around the pin 11 keeps the pin in position against the countersunk socket 10 and the lever 12 in bearing relation with the washer on the end of the pin 11. The lever 12 is preferably struck up as at 19' to present a better contacting surface for contacting with the washer on the pin 11.

The primary pressure ring 8 is provided with a suitable annular ring 20 formed of a non-conducting material such as fibre. Secured to this annular ring 20, and in registering relation with the coil springs 15, are suitable cups 21 for receiving the ends of the coil springs 15. This insulating ring 20 insulates the coil springs from the heat produced by the main driving and driven elements of the clutch assembly and thus preserves the full strength of the springs for the life of the clutch.

Figure 4:
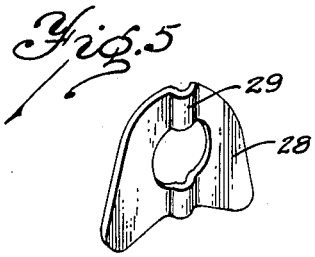
Fig. 4 is a fragmentary sectional view of one of the spring members secured to the secondary pressure plate adapted to bear against the interior surface of the flywheel when the clutch is in assembled position with relation to the flywheel.

The driven disks 22 and 23 are secured to the splined shaft 4 and are provided at their outer circumferences with the usual clutch facings 24. The primary pressure ring 8 is positively moved to release the pressure on the driven disks upon movement of the levers 12, but in order to effect positive release of the secondary ring 9 I have provided a series of resilient members 25 which are preferably secured to the side of the ring 9 which is to be placed adjacent the inner surface of the flywheel 1 when the clutch is assembled, as shown in Figs. 1 and 4. These resilient members are adapted to be compressed by the normal action of the coil springs 15, and upon the pressure exerted by the coil springs being released by the levers 12, these members 25 will force the ring 9 away from the clutch disk adjacent the flywheel.

In order to determine the distance this ring 9 is forced by the resilient members 25, and to definitely determine the amount of clearance between the driving members 8 and 9, I have provided suitable adjustable pins 26 which are spaced around the outer circumference of the cover plate 5. The cover plate 5 is threaded to receive the threaded end of the pin 26, and the primary pressure ring 8 is provided with suitable apertures 27 permitting the ends of the pins 26 to project therethrough. Each pin 26 is provided with a specially formed washer 28 which is provided with a struck up portion 29 which is adapted to fit in suitable radial serrations 30 which are formed in the under side of the head of the pin or screw 26. The shape of the washer prevents it from rotating upon rotation of the pin 26 by reason of contact with an adjacent portion of the cover plate. A coil spring 31 is positioned between the specially formed washer 28 and the base of the channel formed in the cover plate 5. It will be obvious that this coil spring pressing against the washer 28 will force the ridge 29 into one of the serrations 30 in the head of the screw 26 and thus maintain it in that position.

In assembling the clutch structure the screw 26 is preferably screwed inwardly until it contacts with the secondary ring 9. It is then backed away half a turn determined by the struck up portion 29 snapping into the serrations 30 to properly position it away from the secondary plate 9 to thus determine the minimum space between such plates 8 and 9. This minimum spacing between the plates 8 and 9 will thus assure, upon release of the pressure of the springs 15 by the levers 12, that the friction between the driving members and the driven clutch disks will be released.

From the above description it will be seen that the unitary cover plate forms the innermost portion of the clutch assembly whereby the levers are positioned within the cover plate and protrude therethrough, the whole assembly forming an extremely compact unit. It will also be seen that the spring members for actuating the clutch in driving position will retain their resiliency without in any way losing their temper due to heating by other parts of the clutch. It will also be obvious that I have provided a novel means for easily, accurately and quickly determining the clearance between the pressure rings.

A modified form of my invention is illustrated in Fig. 6 wherein the cover plate, which may be designated 32, is provided with separate containers 33 for receiving the clutch springs. In this modification, the pressure ring 8 is shown provided with suitable pins 34 together with positioning members 35, these pins and positioning members 35 extending inwardly of the coil springs a considerable distance whereby the heat from the pressure ring 8 will be considerably diffused before it can be transmitted to the coils of the spring members.

What I claim is:

1. In a clutch, the combination of a cupped cover plate provided with openings in the sides of the cup, pressure relieving levers of the first order projecting through said openings and outside of the cover plate, a portion of said cover plate forming said openings serving as a fulcrum for said levers.

2. In a clutch, the combination of a cup-like cover plate provided with openings in the sides of the cup, and a plurality of pressure relieving levers positioned within said cover plate and projecting through said openings and outside the cover plate, portions of the cover plate forming part of said openings serving as fulcrums for said levers, said levers being operatively connected to the clutch mechanism at points outside the cover plate.

3. In a clutch, the combination of a cup-like cover plate provided with apertures for receiving pressure relieving pins, and also provided in the sides of the cup with openings in radial alignment with said apertures, pins positioned within said apertures and pressure relieving levers projecting through said openings, the cover plate serving as a fulcrum for said levers, and the load ends of the levers extending outside of the sides of the cup-like cover member for connection with said pins.

4. In a clutch, the combination with a driving member and a driven member, of a clutch assembly comprising driving and driven elements and packing springs therefor, pressure relieving levers and a cover plate for said elements, springs and levers, said cover plate comprising integral projections for receiving and positioning the springs, said cover plate being also provided with openings through which the pressure relieving levers project and in which they fulcrum at a point intermediate their ends.

5. In a clutch, the combination with a driving member and a driven member, of a clutch assembly comprising driving and driven elements and packing springs therefor, a cover plate for said elements having openings and pressure relieving levers extending through the openings and operatively connected to the driving elements outside the cover plate, portions of the cover forming part of said openings serving as fulcrums for said levers.

6. In a clutch, the combination of driving and driven elements, packing springs for normally compressing said driving and driven elements and means positioned between one of said elements and said springs for materially preventing the transfer of heat from said elements to said springs.

7. In a clutch, the combination of a pressure ring and a driven disk, packing springs for causing pressure between said ring and disk, a cover plate for receiving and positioning said packing springs, and means positioned between said springs and said pressure ring for materially preventing the transfer of heat from said pressure ring and driven disc to said springs.

8. In a clutch, the combination of a pressure ring, packing springs therefor and insulating means secured to said pressure ring for receiving and spacing the springs from the pressure ring.

9. In a clutch, the combination with a driving and a driven member, of a clutch assembly comprising driving and driven elements, packing springs and pressure relieving levers therefor, a cover plate for said elements, springs and levers, driving studs for said driving elements, means for securing said cover plate to said driving studs and means positioned between said springs and one of said elements tending to prevent the transfer of heat from said driving and driven elements to said springs.

10. In a clutch, the combination with a fly wheel and a driven member of a clutch assembly comprising driving elements and driven elements, driving studs for said driving elements, and a spacer member operable from the outside of the clutch for adjustably determining the clearance between a driving element and the flywheel.

11. A clutch having in combination a driving member, a plurality of driving elements, driving means for connecting said driving member and said driving elements, a driven disk between said driving member and one of said driving elements and means for adjustably determining the clearance between said driving elements.

12. A clutch having in combination a flywheel, a driving element and a cover plate, a second driving element, driven means positioned between said driving elements and means secured to said cover plate and projecting through said first driving element for determining the clearance between said driving elements and fly wheel.

13. A clutch, having in combination a driving member, driving elements and driving studs for operably connecting said driving member and said driving elements, a cover plate mounted on said driving studs and means secured to said cover plate and operable from the outside thereof for determining the clearance between said driving elements and driving member.

14. A clutch, having in combination a driving member, driving rings and a clutch disk positioned between one of said driving rings and driving member, driving studs secured to said driving member passing through said driving rings, a cover plate secured to said driving studs, packing springs mounted within said cover plate and bearing against one of said driving rings, pressure relieving members for backing away one of said driving rings, resilient means tending to back away the second driving ring upon relief of the pressure by said driving ring and means for determining the clearance between said driving rings upon the actuation of said relieving members.

15. A clutch assembly, having in combination driving elements and driven elements spaced therebetween, a cover plate for said clutch assembly and spacing means for said driving elements mounted on said cover plate, and provided with notches, and spring pressed means for contacting with said notches whereby said spacing means may be adjusted and held in adjusted position.

16. In a clutch, the combination with a driving and a driven member of a clutch assembly comprising driving and driven elements together with spring means for packing the same, and means for relieving the pressure, a cover plate for said clutch assembly and an adjustable contact member mounted on the cover plate and adapted to contact with and be backed away from one of the driving elements to regulate the amount of clearance between the driving elements when the clutch is disengaged.

17. In a clutch, the combination with a driving and a driven member of a clutch assembly comprising driving and driven elements together with spring means for packing the same, and means for relieving the pressure, a cover plate for said clutch assembly and an adjustable contact member mounted on the cover plate and adapted to be backed away from the driving member to regulate the amount of clearance between the driving elements when the clutch is disengaged, said adjustable contact member being provided with notches and means for resiliently contacting therewith whereby the notches predetermine the amount of backing away.

18. In a clutch, the combination of a driving member, a pair of driving elements, a pair of driven elements one of which is disposed between the driving member and one driving element, and one of which is disposed between the two driving elements, packing springs for packing the aforementioned elements together in driving relation, means for releasing the packing pressure and withdrawing one driving element from driving relation with respect to the adjacent driven element, means for automatically withdrawing the other of said driving elements from its driving position, and adjustable means for limiting the withdrawing of this said other driving element.

19. In a clutch, the combination of a plurality of driving elements one of which is longitudinally stationary and the others of which are longitudinally movable, driven elements each of which is disposed between two of the driving elements, packing springs for packing the movable driving elements towards the stationary driving element to effect a driving connection with the driven elements, means for withdrawing one driving element from its driving position against the action of the packing springs, and means for automatically withdrawing another of the driving elements from its driving position upon release of the packing pressure.

20. In a clutch, the combination of a flywheel, a driving element spaced therefrom, a second driving element spaced from the first driving element, a driven element between the fly wheel and the first driving element, a driven element between the first and second driving elements, means for packing all of said elements against the fly-wheel to effect driving relation, means for relieving the packing pressure and for retracting the second driving element away from the flywheel to release the adjacent driven element, and means for automatically retracting the first driving element from the fly wheel to release the other driven element.

21. In a clutch, the combination of a flywheel, a driving element spaced therefrom, a second driving element spaced from the first driving element, a driven element between the fly wheel and the first driving element, a driven element between the first and second driving elements, means for packing all of said elements against the flywheel to effect driving relation, means for relieving the packing pressure and for retracting the second driving element away from the fly-wheel to release the adjacent driven element, means for automatically retracting the first driving element from the fly-wheel to release the other driven element, and adjustable means for determining the extent to which the first driving element can be automatically retracted.

In testimony whereof I affix my signature.

ERNEST E. WEMP.